US012608221B1

(12) United States Patent
Kao et al.

(10) Patent No.: US 12,608,221 B1
(45) Date of Patent: Apr. 21, 2026

(54) MULTIVARIATE TIME SERIES MACHINE LEARNING MODEL FOR CLASSIFYING NETWORK-INTENSIVE CLOUD WORKLOADS

(71) Applicant: Amazon Technologies, Inc., Seattle, WA (US)

(72) Inventors: Chia-Yu Kao, Sammamish, WA (US); Siyu Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 648 days.

(21) Appl. No.: 18/066,139

(22) Filed: Dec. 14, 2022

(51) Int. Cl.
    *G06F 9/455* (2018.01)
(52) U.S. Cl.
    CPC ............... *G06F 9/45558* (2013.01); *G06F 2009/45562* (2013.01); *G06F 2009/4557* (2013.01); *G06F 2009/45595* (2013.01)
(58) Field of Classification Search
    CPC ....... G06F 9/45558; G06F 2009/45562; G06F 2009/4557; G06F 2009/45595
    See application file for complete search history.

(56) References Cited

U.S. PATENT DOCUMENTS

| | | | | |
|---|---|---|---|---|
| 10,616,078 | B1 * | 4/2020 | Thomas | G06F 11/3495 |
| 2020/0225913 | A1 * | 7/2020 | Chen | G06F 7/544 |
| 2021/0103828 | A1 * | 4/2021 | Bitterfeld | G06N 20/20 |
| 2021/0116982 | A1 * | 4/2021 | Khanna | G06F 1/26 |
| 2023/0281051 | A1 * | 9/2023 | Martin | G06F 9/5072 718/102 |
| 2024/0036999 | A1 * | 2/2024 | Aurongzeb | G06F 9/5055 |
| 2024/0095315 | A1 * | 3/2024 | Bartfai-Walcott | G06F 21/107 |
| 2024/0103899 | A1 * | 3/2024 | Chen | G06F 9/45558 |

OTHER PUBLICATIONS

Pravendra Singh, HetConv: Heterogeneous Kernel-Based Convolutions for Deep CNNs, CVPR 2019 (Year: 2019).*
Abdul-Rahman, O.A. et al., "Towards Understanding the Usage Behavior of Google Cloud Users: The Mice and Elephants Phenomenon," 2014 IEEE 6th International Conference on Cloud Computing Technology and Science, Dec. 2014, pp. 272-277.

(Continued)

*Primary Examiner* — Dong U Kim
(74) *Attorney, Agent, or Firm* — Nicholson DeVos Webster & Elliott LLP

(57) ABSTRACT

Techniques are described for a compute optimizer service of a cloud provider network that uses a multivariate time series machine learning (ML) model to identify network-intensive cloud workloads and to provide recommendations for optimizing such workloads. A network-intensive workload, for example, broadly represents any computing workload that uses relatively more network resources than typical workloads (e.g., such as load balancers, web servers, and the like). The ML model combines a set of weak learners and a meta-model on top of the weak learners to infer the final predictions of whether workloads are network-intensive workloads. The ML model identifies network-intensive workloads in part by recognizing the patterns within the time series data reflecting certain resource usage patterns rather than only deriving embedded statistical information, thereby enabling the model to more accurately identify network-intensive workloads.

20 Claims, 9 Drawing Sheets

(56) References Cited

OTHER PUBLICATIONS

Arlitt, M.F. et al., "Internet Web Servers: Workload Characterization and Performance Implications," IEEE/ACM Trans. Netw. vol. 5, vol. 5, Oct. 1997, pp. 631-645.

Arlitt, M.F. et al., "Web Server Workload Characterization: The Search for Invariants," Proceedings of the 1996 ACM SIGMETRICS international conference on Measurement and modeling of computer systems (SIGMETRICS '96), May 1996, pp. 126-137.

Bang, J. et al., "HPC Workload Characterization Using Feature Selection and Clustering," SNTA '20: Proceedings of the 3rd International Workshop on Systems and Network Telemetry and Analytics, Jun. 2020, pp. 33-40.

Bostrom, A.G. et al., "Binary Shapelet Transform for Multiclass Time Series Classification," Trans. Large Scale Data Knowl. Centered Syst., Sep. 2015, pp. 257-269.

Chen, S. et al., "Workload Characterization of Interactive Cloud Services on Big and Small Server Platforms," 2017 IEEE International Symposium on Workload Characterization (IISWC), Oct. 2017, pp. 125-134.

Chernoff, Betsy, "Optimizing NGINX load balancing on Amazon EC2 A1 instances," AWS Compute Blog, Sep. 4, 2019, retrieved from Internet: https://aws.amazon.com/blogs/compute/optimizing-nginx-load-balancing-on-amazon-ec2-a1-instances/ on Jun. 11, 2023, 2 pages.

Chesire, M. et al., "Measurement and Analysis of a Streaming-Media Workload," 3rd USENIX Symposium on Internet Technologies and Systems (USITS 01), Mar. 2021, 12 pages.

Cirne, W. et al., "A Comprehensive Model of the Supercomputer Workload," Proceedings of the Fourth Annual IEEE International Workshop on Workload Characterization, WWC-4, 2001, 19 pages, retrieved from Internet: https://citeseerx.ist.psu.edu/document?repid=rep1&type=pdf&doi=5d462b30c3847c6ba8fd4b02b45ba36a8e001701.

Dezhabad, N. et al., "Cloud Workload Characterization and Profiling for Resource Allocation," 2019 IEEE 8th International Conference on Cloud Networking (CloudNet), Nov. 2019, pp. 1-4.

Garraghan, P. et al., "An Analysis of the Server Characteristics and Resource Utilization in Google Cloud," 2013 IEEE International Conference on Cloud Engineering (IC2E), Mar. 2013, pp. 124-131.

Hart, David L., "Measuring TeraGrid: Workload characterization for a high-performance computing federation," International Journal of High Performance Computing Applications, vol. 25, No. 4, Dec. 2011, pp. 451-465, retrieved from Internet: https://www.researchgate.net/publication/220457403_Measuring_TeraGrid_Workload_characterization_for_a_high-performance_computing_federation.

Khan, A. et al., "Workload Characterization and Prediction in the Cloud: A Multiple Time Series Approach," IEEE Network Operations and Management Symposium, Apr. 2012, pp. 1287-1294.

Middlehurst, M. et al., "The Temporal Dictionary Ensemble (TDE) Classifier for Time Series Classification," Joint European Conference on Machine Learning and Knowledge Discovery in Databases, Feb. 2021, pp. 660-676.

Mulia, W.D. et al., "Cloud Workload Characterization," IETE Technical Review, vol. 30, No. 5, Sep.-Oct. 2013, pp. 382-397.

Shen, S. et al., "Statistical Characterization of Business-Critical Workloads Hosted in Cloud Datacenters," 2015 15th IEEE/ACM International Symposium on Cluster, Cloud and Grid Computing, May 2015, pp. 465-474.

Urgaonkar, B. et al., "An Analytical Model for Multi-tier Internet Services and Its Applications," ACM SIGMETRICS Performance Evaluation Review, vol. 33, Issue 1, Jun. 2005, pp. 291-302.

Yip, Martin, "Optimizing Network Intensive Workloads on Amazon EC2 A1 Instances," AWS Compute Blog, Apr. 23, 2019, retrieved from Internet: https://aws.amazon.com/blogs/compute/optimizing-network-intensive-workloads-on-amazon-ec2-a1-instances/ on Jun. 11, 2023, 2 pages.

* cited by examiner

400

500

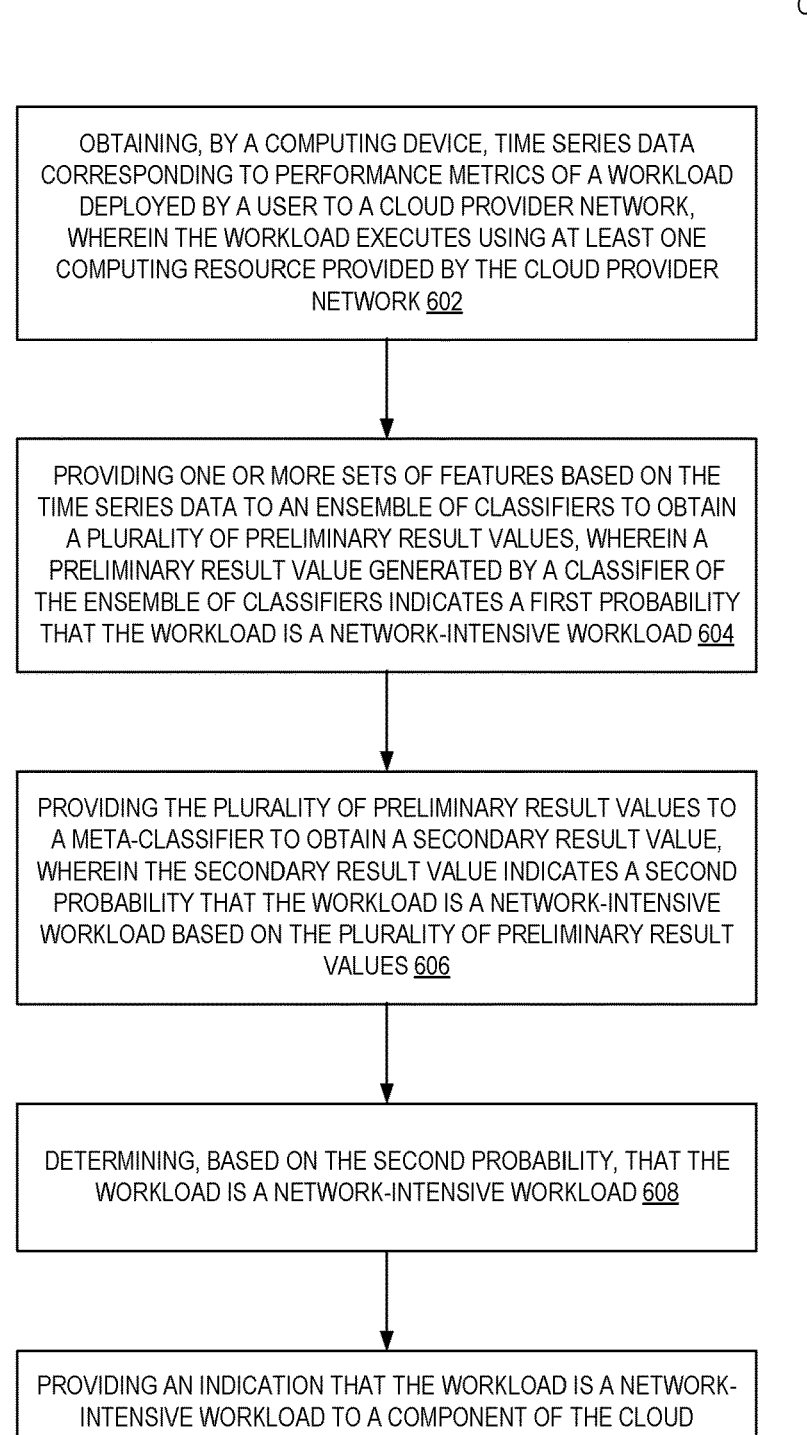

OPERATIONS
600

OBTAINING, BY A COMPUTING DEVICE, TIME SERIES DATA
CORRESPONDING TO PERFORMANCE METRICS OF A WORKLOAD
DEPLOYED BY A USER TO A CLOUD PROVIDER NETWORK,
WHEREIN THE WORKLOAD EXECUTES USING AT LEAST ONE
COMPUTING RESOURCE PROVIDED BY THE CLOUD PROVIDER
NETWORK 602

PROVIDING ONE OR MORE SETS OF FEATURES BASED ON THE
TIME SERIES DATA TO AN ENSEMBLE OF CLASSIFIERS TO OBTAIN
A PLURALITY OF PRELIMINARY RESULT VALUES, WHEREIN A
PRELIMINARY RESULT VALUE GENERATED BY A CLASSIFIER OF
THE ENSEMBLE OF CLASSIFIERS INDICATES A FIRST PROBABILITY
THAT THE WORKLOAD IS A NETWORK-INTENSIVE WORKLOAD 604

PROVIDING THE PLURALITY OF PRELIMINARY RESULT VALUES TO
A META-CLASSIFIER TO OBTAIN A SECONDARY RESULT VALUE,
WHEREIN THE SECONDARY RESULT VALUE INDICATES A SECOND
PROBABILITY THAT THE WORKLOAD IS A NETWORK-INTENSIVE
WORKLOAD BASED ON THE PLURALITY OF PRELIMINARY RESULT
VALUES 606

DETERMINING, BASED ON THE SECOND PROBABILITY, THAT THE
WORKLOAD IS A NETWORK-INTENSIVE WORKLOAD 608

PROVIDING AN INDICATION THAT THE WORKLOAD IS A NETWORK-
INTENSIVE WORKLOAD TO A COMPONENT OF THE CLOUD
PROVIDER NETWORK 610

*FIG. 6*

MULTIVARIATE TIME SERIES MACHINE LEARNING MODEL FOR CLASSIFYING NETWORK-INTENSIVE CLOUD WORKLOADS

BACKGROUND

Cloud computing platforms provide on-demand, managed computing resources to customers. Such computing resources (e.g., compute and storage capacity) are often provisioned from large pools of capacity installed in data centers. Customers can request computing resources from the "cloud" and the cloud can provision compute resources to those customers. Technologies such as virtual machines and containers are often used to allow customers to securely share capacity of computer systems. The workloads deployed by users to a cloud using such computing resources can vary widely in terms of the amount of memory, processor, and networking resources used.

BRIEF DESCRIPTION OF DRAWINGS

Various examples in accordance with the present disclosure will be described with reference to the drawings, in which:

FIG. 6 is a flow diagram illustrating operations of a method for using a multivariate time series ML model for classifying network-intensive workloads according to some examples.

DETAILED DESCRIPTION

The present disclosure relates to methods, apparatus, systems, and non-transitory computer-readable storage media for a compute optimizer service of a cloud provider network that uses a multivariate time series machine learning (ML) model to identify network-intensive cloud workloads and to provide recommendations for optimizing such workloads. As used herein, a network-intensive workload broadly represents any computing workload that uses relatively more network resources than typical workloads (e.g., such as load balancers, web servers, and the like). According to examples described herein, the ML model combines a set of weak learners and a meta-model on top of the weak learners to infer the final predictions of whether workloads are network-intensive workloads. The ML model identifies network-intensive workloads in part by recognizing the patterns within the time series data reflecting certain resource usage patterns rather than only deriving embedded statistical information, thereby enabling the model to more accurately identify network-intensive workloads.

The rapid growth of cloud computing has increased the need for more intelligent and efficient network management to make full use of network resources. For cloud providers, it is thus beneficial to build a thorough network behavior profile of user's workload to elastically scale up and down the provisioned resources, to effectively fulfill users' network resource requirements, and to provide enhanced networking resource recommendations to users. However, identifying which workloads represent those that consume significant network resources presents a number of challenges.

For example, to build a network behavior profile of a given workload, a deep understanding of workload properties and characteristics typically is used. A typical network-intensive workload, for example, is sensitive to input load, the size of incoming requests, and the availability of the underlying network resources, among other possible inputs. A network-intensive workload thus presents unique resource characteristics, where network usage is intensive, but the workload may exhibit relatively low usage in other utilization dimensions (e.g., in disk storage and I/O operations). In addition, a strong correlation between CPU utilization and network throughput is commonly observed in network intensive workloads. In sum, analyzing workloads for such complex, interrelated patterns over time is challenging.

These challenges, among others, are addressed by the compute optimizer service described herein providing a network-intensive workload classifier that can be used to accurately identify network-intensive workloads. The compute optimizer service can further generate recommendations for optimizing the deployment of such workloads in a cloud provider network, thereby improving the performance of the workloads and the systems with which the workloads may be integrated.

Figure 1:
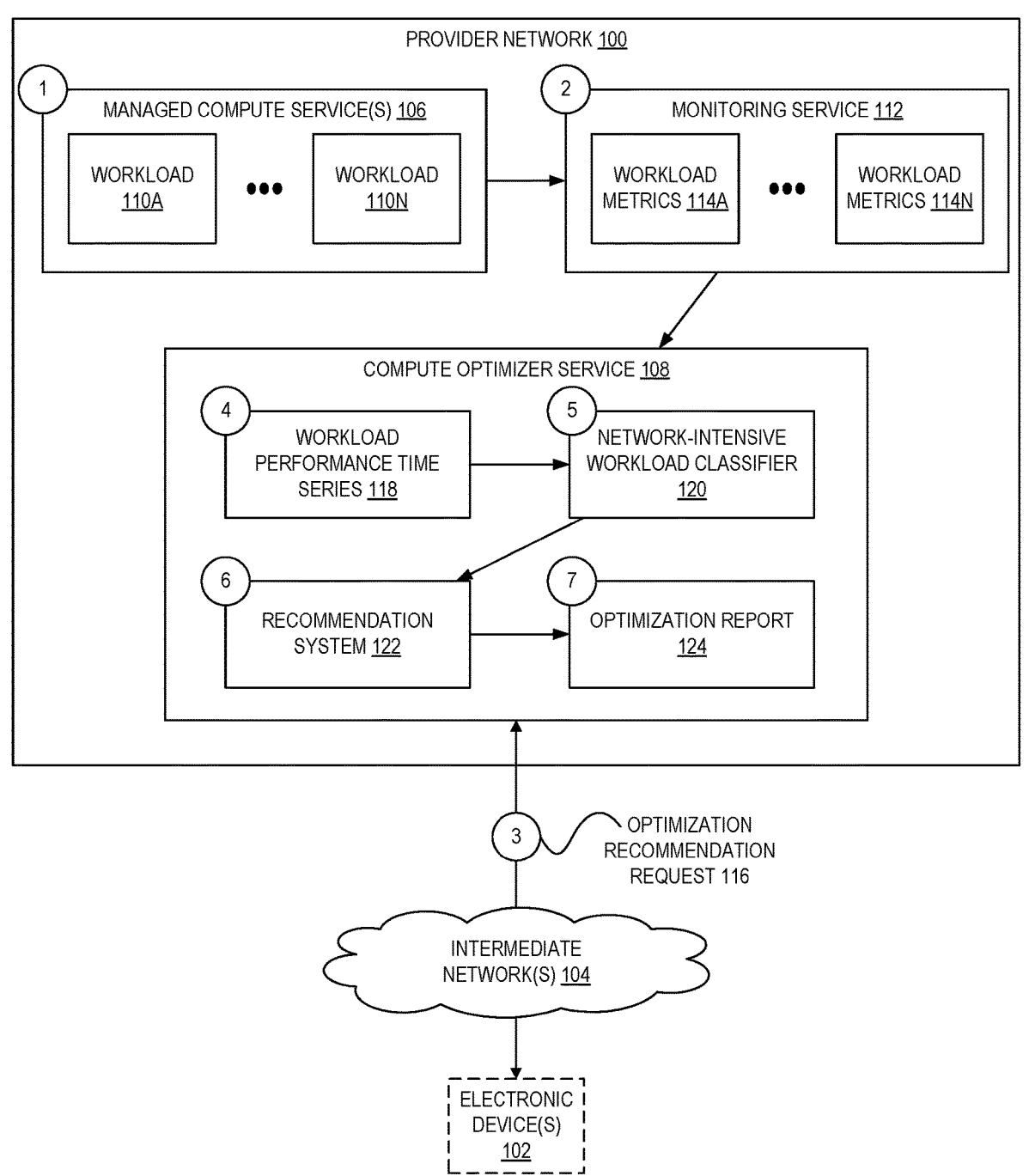
FIG. 1 is a diagram illustrating an environment for providing a compute optimizer service of a cloud provider network that uses a machine learning (ML) model to identify and provide recommendations for optimizing computing resources used to host network-intensive workloads according to some examples.

FIG. 1 is a diagram illustrating an environment for providing a compute optimizer service of a cloud provider network that uses a machine learning (ML) model to identify and provide recommendations for optimizing resources allocated to network-intensive workloads according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can use electronic device(s) 102 interact with a provider network 100 across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

As described herein, one type of service that a provider network may provide may be referred to as a "managed compute service" 106 that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A compute optimizer service 108 enables users of a cloud provider network 100 to identify optimal computing resource configurations for the computing resources (e.g., compute instances, containers, storage resources, etc.) a user has deployed to support users' workloads. The compute optimizer service 108, for example, can provide a set of APIs and other interfaces that enable users of a cloud provider network 100 to obtain recommendations for optimal resources to use for users' workloads (e.g., workload 110A, . . . , workload 110N).

In some examples, at circle "1," a user deploys one or more workloads (e.g., workloads 110A, . . . , 110N) using computing resources provided by a cloud provider network 100 (including. e.g., VMs, containers, or other compute resources provided by one or more managed compute service(s) 106, among other possible resources). The workloads can broadly include any type of software-based applications, services, distributed systems, or combinations thereof, and can implement virtually any type of functionality.

At circle "2," in some examples, workload metrics are collected reflecting performance of users' workloads over time. For example, a monitoring service 112 or other component of a cloud provider network 100 can be used to collected metrics (e.g., workload metrics 114A, . . . , workload metrics 114N). The monitoring service 112, for example, represents a configurable monitoring service used to collect and track metrics, collect and monitor log files, set alarms, among other possible functionality. The monitoring service 112 can be used to monitor a wide variety of computing resources including, for example, VM instances, containers, databases, custom applications, log files, etc.

In some examples, at circle "3," the compute optimizer service 108 receives a request 116 to generate optimization recommendations for computing resources used to execute workloads associated with a user's account (e.g., one or more of workloads 110A, . . . , 110N). In some examples, a request 116 can include a user requesting the compute optimizer service 108 to analyze the specifications and utilization metrics of their computing resources (e.g., which may include computing resources used to host one or more network-intensive workloads).

In some examples, at circle "4," the compute optimizer service 108 obtains workload performance times series 118 data related to the one or more workloads for which recommendations are to be provided. The compute optimizer service 108, for example, can begin to analyze utilization metrics based on data collected by the monitoring service 112, directly from one or more managed compute service(s) 106, or from any other source.

Figure 2:
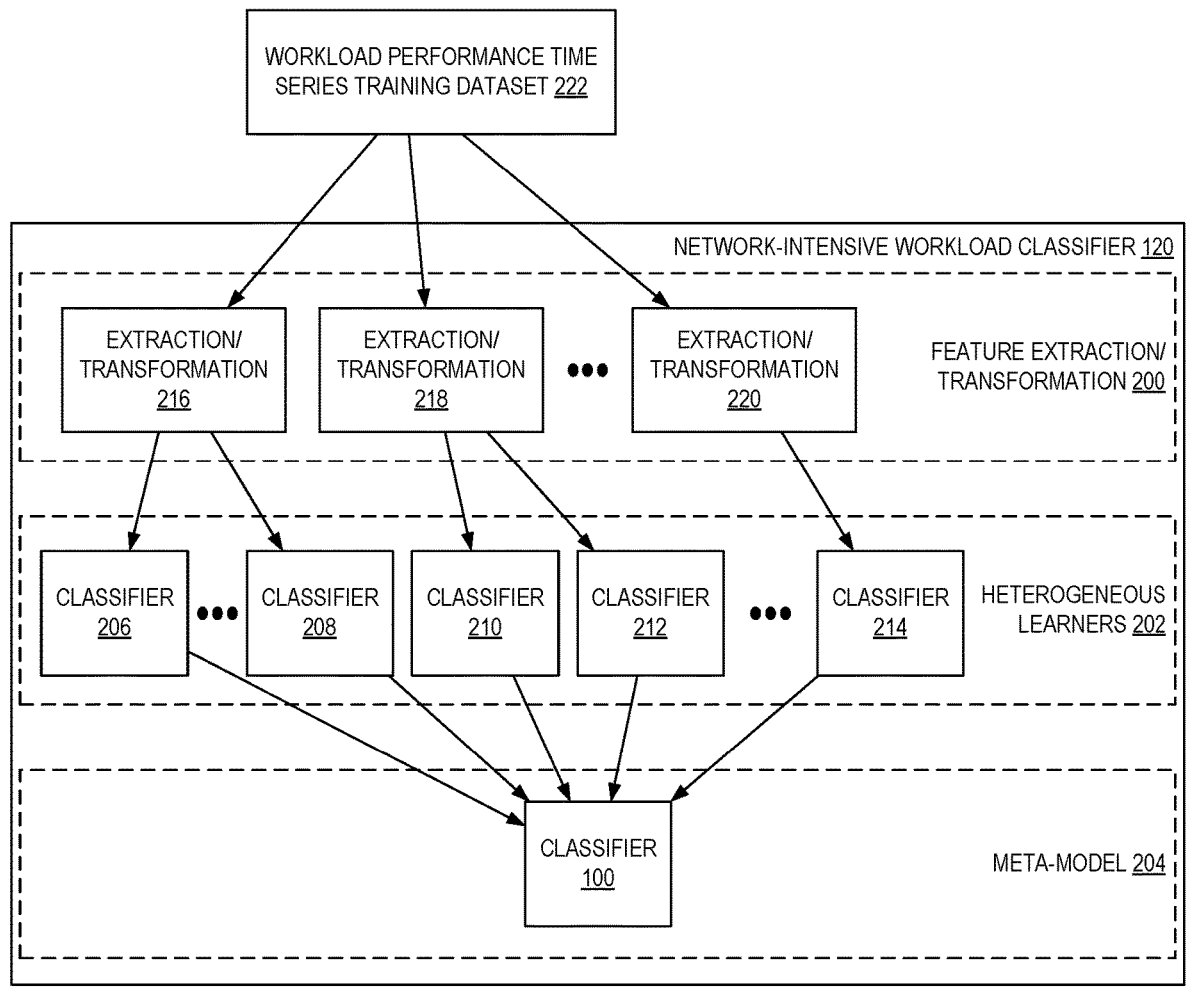
FIG. 2 is a diagram illustrating additional details of a ML model used by a compute optimizer service of a cloud provider network to identify network-intensive workloads according to some examples.

In some examples, at circle "5," the workload performance time series 118 data is provided as input to a network-intensive workload classifier 120 to obtain a prediction as to whether one or more of a user's workloads represent network-intensive workloads. FIG. 2 is a diagram illustrating additional details of a ML model used by a compute optimizer service 108 of a cloud provider network 100 to identify network-intensive workloads according to some examples. The network-intensive workload classifier 120 broadly is a time series classification model, where the model is designed to predict a discrete target label from multivariate time series. In contrast to traditional classification models, time series classification involves analyzing unstructured time series data, where the order of the values can have meaning and, in particular, consecutive time points are often likely to be highly correlated. The network-intensive workload classifier 120 uses several types of ML models to generate predictions (including different types of feature extraction/transformation 200 processes) and, to further boost performance, the classifier evolves from a single classification model to an ensemble stacking classifier, consisting of several heterogeneous learners 202 as base estimators, and combines the results of the base estimators using a meta-model 204 to predict final predictions.

As shown in FIG. 2, each of the heterogeneous learners (e.g., including a classifier 206, a classifier 208, a classifier 210, a classifier 212, . . . , a classifier 214, where these classifiers can include any combination of ridge classifiers, naive Bayes classifiers, decision tree classifiers, neural network classifiers, logistic regression models, k-nearest neighbor (KNN) classifiers, random forest classifiers, diverse representation canonical interval forest classifiers (DrCIF), and the like). Each of the classifiers can be associated with its own feature extraction/transformation process (including, e.g., extraction/transformation 216, extraction/transformation 218, extraction/transformation 220, where these processes can include RandOm Convolutional Kernel Transformation (ROCKET) extraction/transformation processes, MiniROCKET extraction/transformation processes, the use of canonical features, etc.) that converts a workload performance time series training dataset 222 (e.g., including performance metrics for known network-intensive workloads, such as performance metrics for load balancers, web servers, etc.).

The ROCKET data transformation processes, for example, involve extracting features from time series using a large number of random convolutional kernels k, in which all the parameters of the kernels, including length, weights, bias, dilation, and padding, are randomly generated from fixed distributions. For each workload, instead of applying random kernels on all dimensions, ROCKET randomly picks one dimension to transform. At the end, ROCKET generates two features for each kernel, the maximum value and the proportion of positive values, yielding 2×k features generated for each time series. The classifier, which is built on top of the transformation, is responsible for selecting the most relevant features to perform classification. ROCKET can, in principle, be used with any classifier. In the example of FIG. 2, the classifier 120 includes two linear classifiers and a tree-based classifier (e.g., a Ridge classifier, a logistic regression classifier, and a random forest classifier).

MiniROCKET is an extension of ROCKET proposed to reduce the randomness of the parameters of the kernels by using a fixed value or sampling from smaller distributions. MiniROCKET lowers the computational complexity with a much faster procedure and extracts only a proportion of positive values for each kernel. Like ROCKET, Mini-ROCKET produces features which can be used to train a classifier. In the example of FIG. 2, the classifier 120 again uses a Ridge classifier, a logistic regression classifier, and a random forest classifier, although other types or combinations of classifiers can be used.

DrCIF is an interval-based ensemble that aims to find discriminatory features over different intervals of subseries. Intervals are randomly taken from the base time series, the first order difference series, and the periodograms of the whole series. A configured number a is randomly selected to determine the number of features to extract from the selected intervals. The feature extraction process is repeated k times, and the features are concatenated into a 3×a×k length feature vector for each time series. The base estimator then for DrCIF can, in some examples, be an information gain based DecisionTreeClassifier.

Using the probabilities generated by the heterogeneous learners 202 at the first level as input, a meta-model 204 is trained to predict final labels. In the example of FIG. 2, the meta-model 204 can be a random forest classifier or other model depending on the implementation (e.g., a k-nearest neighbor (KNN) classifier, a decision tree classifier, etc.). In some examples, each of the heterogeneous learners 202 is trained independently and used to generate preliminary result values indicating a probability that a workload is a network-intensive workload. The meta-model 204 classifier then fits and learns with the preliminary result value probabilities generated from the heterogeneous learners 202 as features, and returns final predictions for individual workloads in the end.

Figure 3:
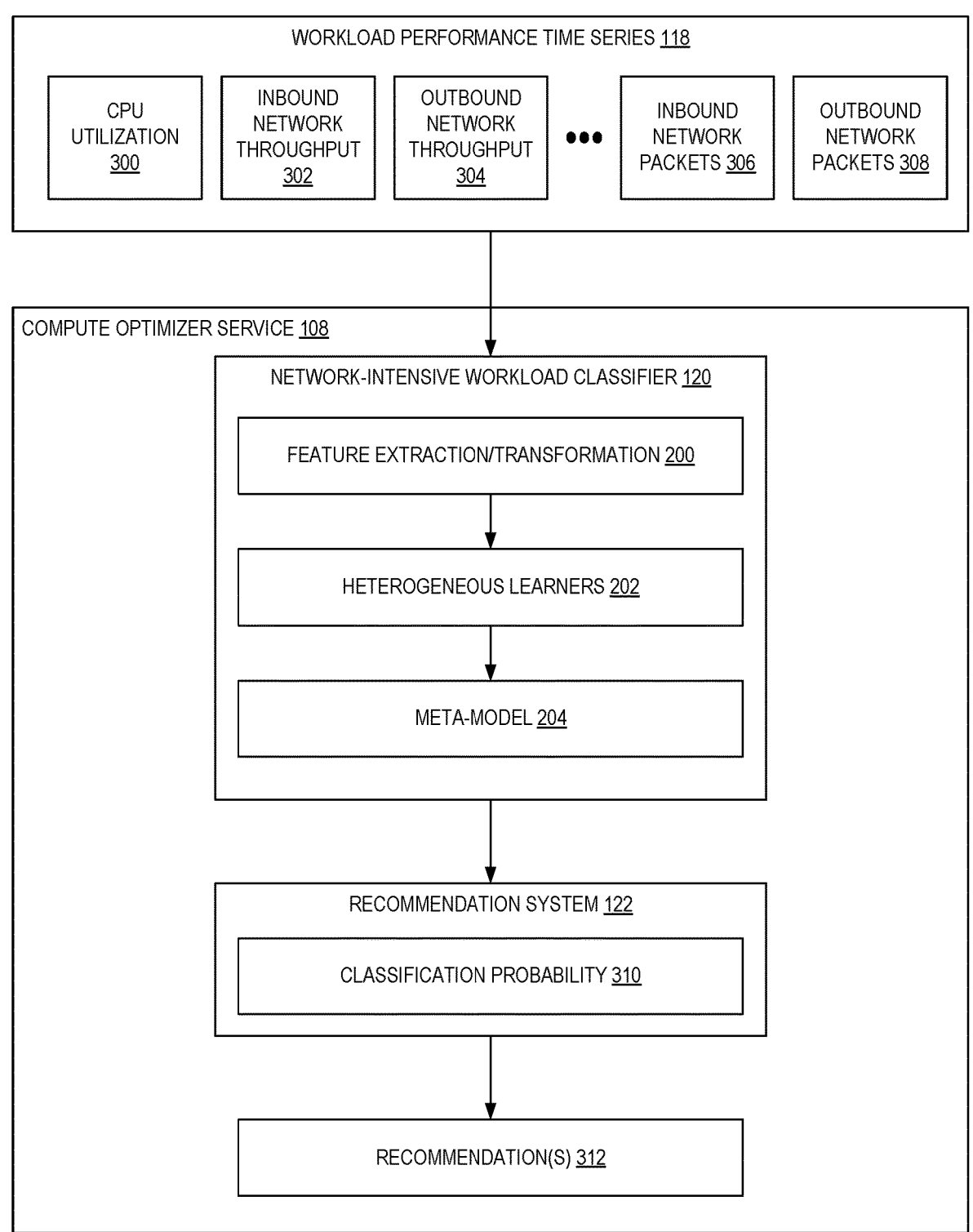
FIG. 3 is a diagram illustrating a process for using a ML model to obtain a network-intensive workload classification probability according to some examples.

FIG. 3 is a diagram illustrating a process for using a ML model to obtain a network-intensive workload classification probability according to some examples. As shown, the input to the compute optimizer service includes workload performance time series 118, which includes several dimensions of time series performance metrics including CPU utilization 300, inbound network throughput 302, outbound network throughput 304, inbound network packets 306, and outbound network packets 308, among other possible dimensions. The workload performance time series 118 can be collected by the compute optimizer service 108, or by another service or component of the provider network 100, over one or more periods of time during operation of the workloads. As shown, during inference, the workload performance time series 118 can be provided as input to the network-intensive workload classifier 120, which performs the processes described in FIG. 2 including feature extraction/transformation 200, use of the heterogeneous learners 202, and use of the meta-model 204 to provide a classification probability 310 indicating whether the workload under analysis is a network-intensive workload (e.g., depending on whether the classification probability 310 exceeds a defined threshold). In some examples, the recommendation system 122 can then optionally generate one or more recommendation(s) 312 depending on whether a workload is classified as being a network-intensive workload.

Returning to FIG. 1, at circle "6," the output from the network-intensive workload classifier 120 can be provided to another component of the provider network 100 such as, for example, a recommendation system 122. The recommendation system 122 can generate, based on the output from the network-intensive workload classifier 120 identifying one or more workloads as network-intensive workloads, recommendations for optimizing a user's computing resources. These recommendations can include, for example, suggested types of VM instances or other compute environments to use to support the workloads. For example, the compute optimizer service 108 can include rules indicating an amount of network resources headroom to be provided to user workloads. If a workload is identified as network-intensive, then a particular instance type can be recommended or otherwise resources can be provided to those workloads. These recommendations can be displayed, at circle "7" for example, in one or more optimization reports 124. The optimization reports can be displayed in one or more web-based consoles or other interfaces.

Figure 4:
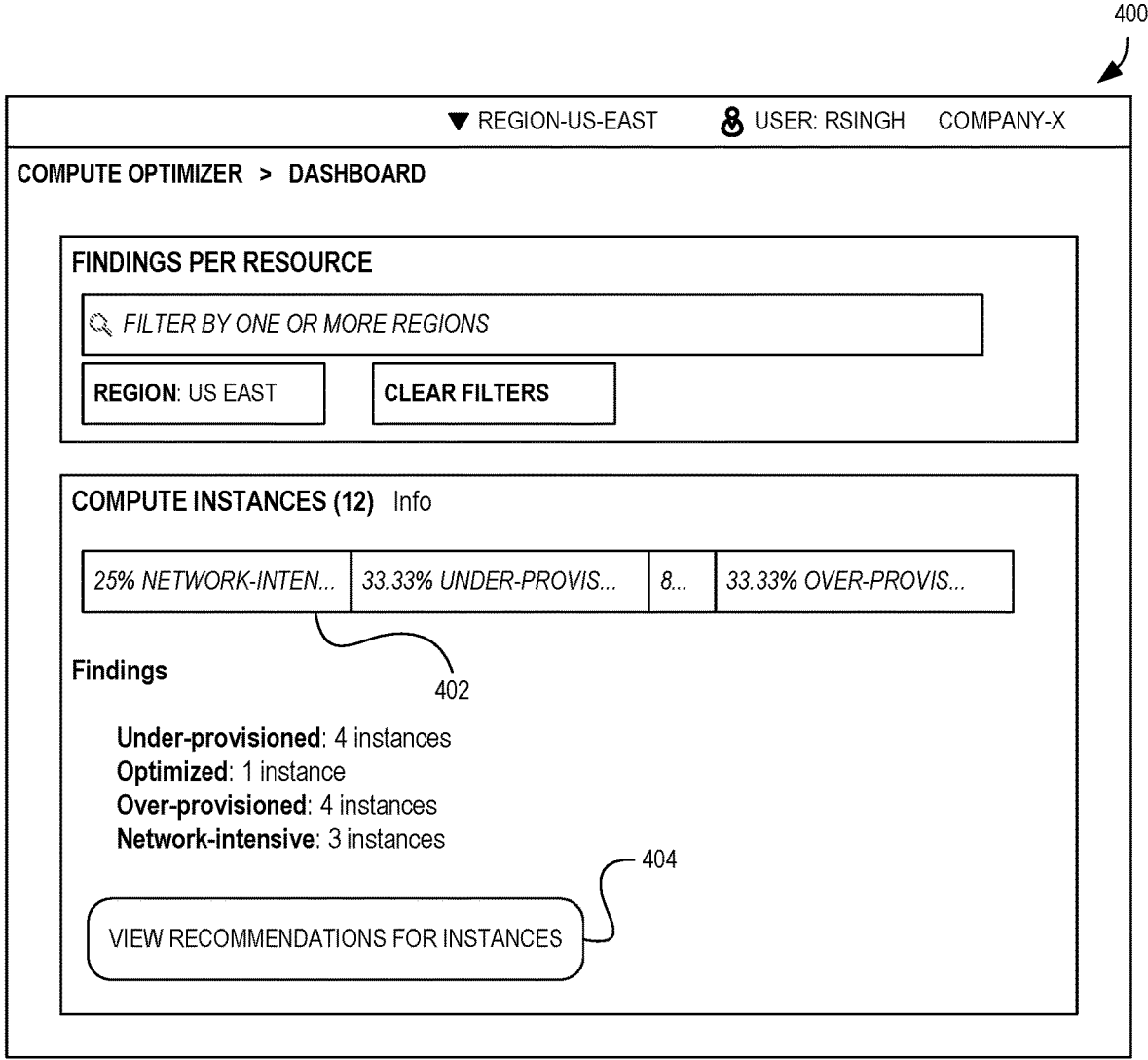
FIG. 4 is an example of an interface displaying compute optimizing findings including identification of network-intensive workloads according to some examples.

FIG. 4 is an example of an interface displaying compute optimization findings including identification of network-intensive workloads according to some examples. As shown, the interface 400 includes a dashboard providing information about users' workloads that have been analyzed by a compute optimizer service 108. The dashboard broadly enables users to evaluate and prioritize optimization opportunities for workloads associated with a user's account. For example, the interface 400 includes a findings section displaying the findings classification count and percentage for workloads associated with a user's account (e.g., workloads running on VM instances, auto scaling groups, on-demand compute functions, etc.). These findings, for example, include indications of workloads that are under-provisioned, over-provisioned, or, based on use of the classifier 120 described herein, network-intensive. As shown, the interface 400 can display information indicating a percentage 402 of a users' workloads that were identified as being network-intensive workloads (alongside other types of workloads). In other examples, the classification of a workload as a network-intensive workload can be a sub-category of another type of finding. For example, the network-intensive workload classification can be "reason" associated with a finding of over-provisioned, under-provisioned, optimized, or any other type of finding and can be displayed accordingly. In some examples, the interface 400 further includes an interface element 404 that can be selected to cause the display of more specific recommendations for optimizing the users' computing resources. In some examples, a user can provide input to an interface requesting to implement a provided recommendation and, based on the input, the compute optimizer service 108 or other component of the provider network 100 can launch a new computing resource (e.g., a new VM instance) having the different type or configuration associated with the recommendation. In some examples, the compute optimizer service 108 optionally can further migrate a user's workload to the new computing resource.

Figure 5:
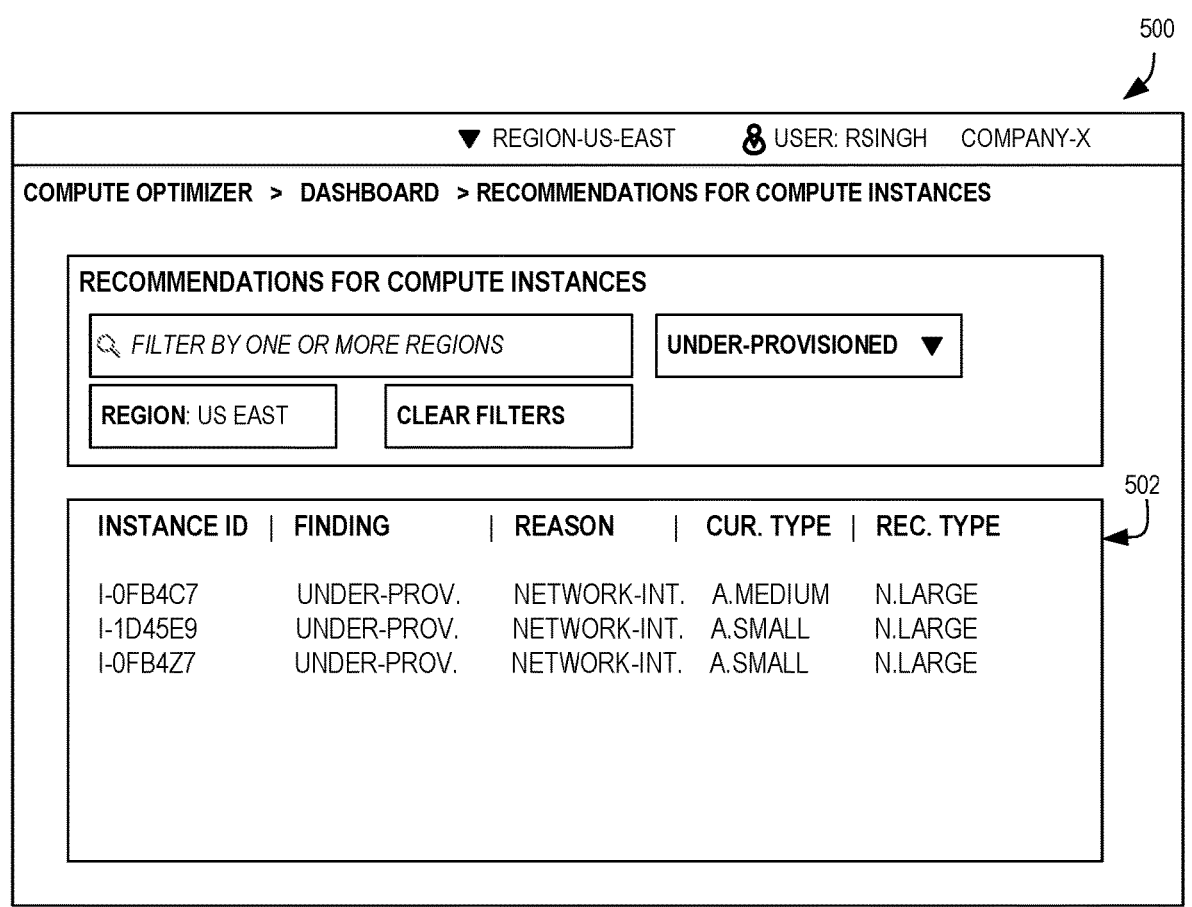
FIG. 5 is an example of an interface displaying recommendations for optimizing computing resources used to host network-intensive workloads according to some examples.

FIG. 5 is an example of an interface displaying recommendations for optimizing computing resources used to host network-intensive workloads according to some examples. The interface 500, for example, includes a list of computing resources used to support a user's workloads, along with one or more recommendations for optimizing those computing resources as generated by the compute optimizer service 108. In the example of FIG. 5, the interface 500 more specifically displays a list of computing resources that the compute optimizer service 108 has identified as being under-provisioned and, more specifically, identified as being under-provisioned because the associated workloads executing on those resources are network intensive. The recommendations 502 provided by service, for example, can include a recommended computing resource type (e.g., a type of network-enhanced VM instance, type of container environment, etc.), a recommended configuration, or other change to a user's computing resources that may provide additional network-related resources to support a network-intensive workload.

FIG. 6 is a flow diagram illustrating operations 600 of a method for using a multivariate time series ML model for classifying network-intensive workloads according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by a compute optimizer service 108 of the other figures.

The operations 600 include, at block 602, obtaining, by a computing device, time series data corresponding to performance metrics of a workload deployed by a user to a cloud provider network, wherein the workload executes using at least one computing resource provided by the cloud provider network.

The operations 600 further include, at block 604, providing one or more sets of features based on the time series data to an ensemble of classifiers to obtain a plurality of preliminary result values, wherein a preliminary result value generated by a classifier of the ensemble of classifiers indicates a first probability that the workload is a network-intensive workload.

The operations 600 further include, at block 606, providing the plurality of preliminary result values to a meta-classifier to obtain a secondary result value, wherein the secondary result value indicates a second probability that the workload is a network-intensive workload based on the plurality of preliminary result values.

The operations 600 further include, at block 608, determining, based on the second probability, that the workload is a network-intensive workload.

The operations 600 further include, at block 610, providing an indication that the workload is a network-intensive workload to another component.

In some examples, the time series data includes data points reflecting, over a period of time for the workload, at least one of: central processing unit (CPU) utilization, inbound network throughput, outbound network throughput, inbound network traffic size, outbound network traffic size, inbound network packet count, network latency, packet loss, or outbound network packet count.

In some examples, the operations 600 further include generating, based on the indication that the workload is a network-intensive workload, a recommendation to optimize the at least one computing resource, wherein the recommendation includes identification of a different type or configuration of computing resource to host the workload at the cloud provider network; and causing display of a recommendation including displaying a recommended type of computing resource to host the workload.

In some examples, the at least one computing resource used to execute the workload includes a virtual machine (VM) instance, and the operations 600 further include: generating, based on the indication that the workload is a network-intensive workload, a recommendation to migrate the workload from the VM instance to a new network-optimized VM instance type; and causing display of the recommendation.

In some examples, the workload is one of a plurality of workloads deployed by the user to the cloud provider network, and operations 600 further include: determining whether each workload of the plurality of workloads is a network-intensive workload; and causing display of an indication of workloads from the plurality of workloads identified as being network-intensive workloads.

In some examples, the ensemble of classifiers includes a heterogeneous set of classifiers, and wherein inputs to at least two of the heterogeneous set of classifiers are generated using two or more types of feature extraction and transformation processes.

In some examples, the meta-classifier is a k-nearest neighbor (KNN) classifier, a random forest classifier, or a decision tree classifier.

In some examples, the ensemble of classifiers includes at least one of: a random forest classifier, a naive Bayes classifier, a ridge classifier, a decision tree classifier, a logistic regression-based classifier, a neural network classifier, a k-nearest neighbor (KNN) classifier, or a Diverse Representation Canonical Interval Forest Classifier (DrCIF).

In some examples, the time series data is collected by a monitoring service of the cloud provider network, wherein the monitoring service collects the time series data by monitoring execution of the workload over time.

In some examples, the ensemble of classifiers is trained based one or more training sets reflecting performance metrics of example network-intensive workloads, wherein the example network-intensive workloads include at least one of: a load balancer, or a web server.

In some examples, the operations further include: generating, based on the indication that the workload is a network-intensive workload, a recommendation to optimize the at least one computing resource, wherein the recommendation includes identification of a different type or configuration of computing resource to host the workload at the cloud provider network; receiving input requesting to implement the recommendation; launching a new computing resource having the different type or configuration; and migrating the workload to the new computing resource.

Figure 7:
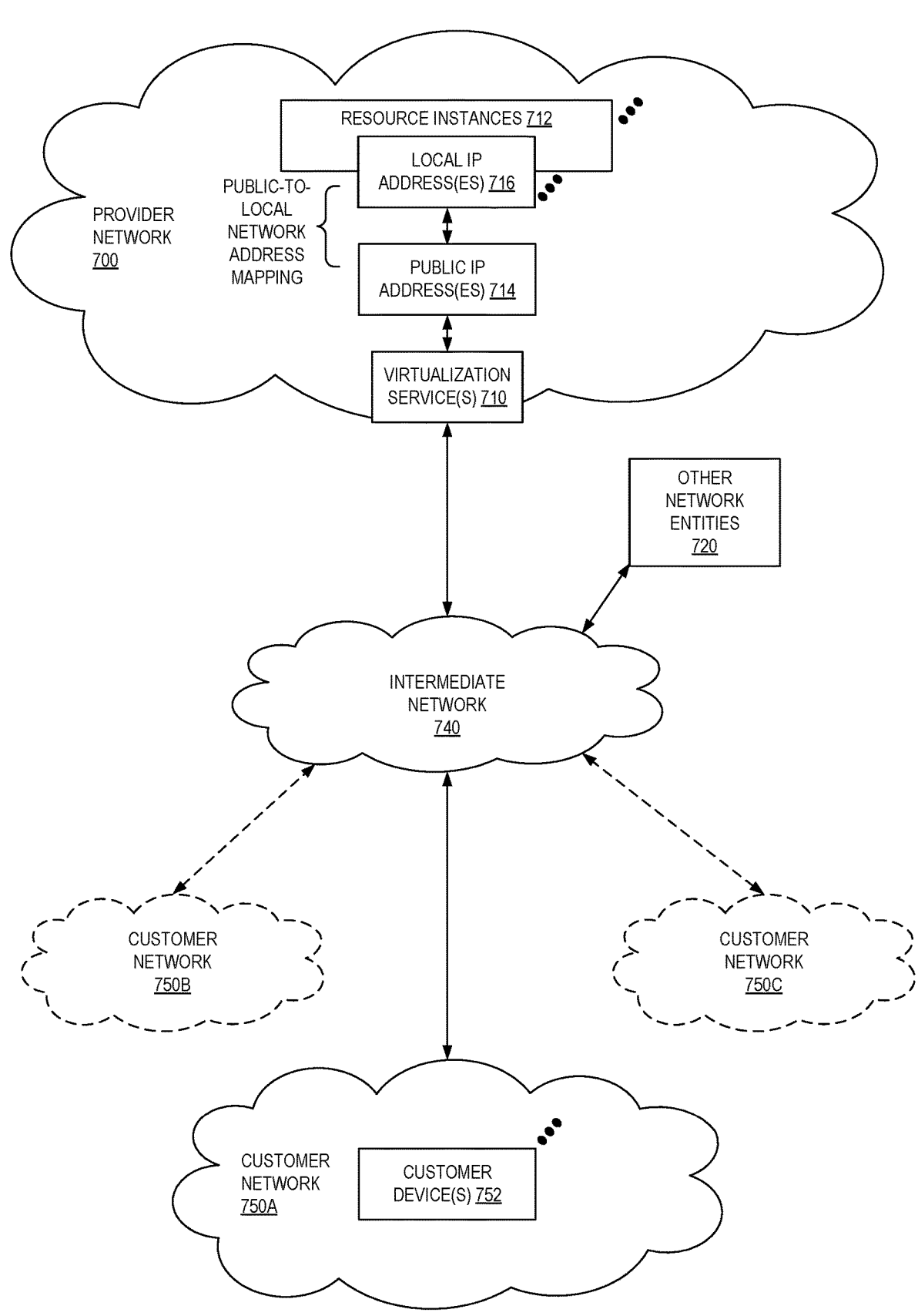
FIG. 7 illustrates an example provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
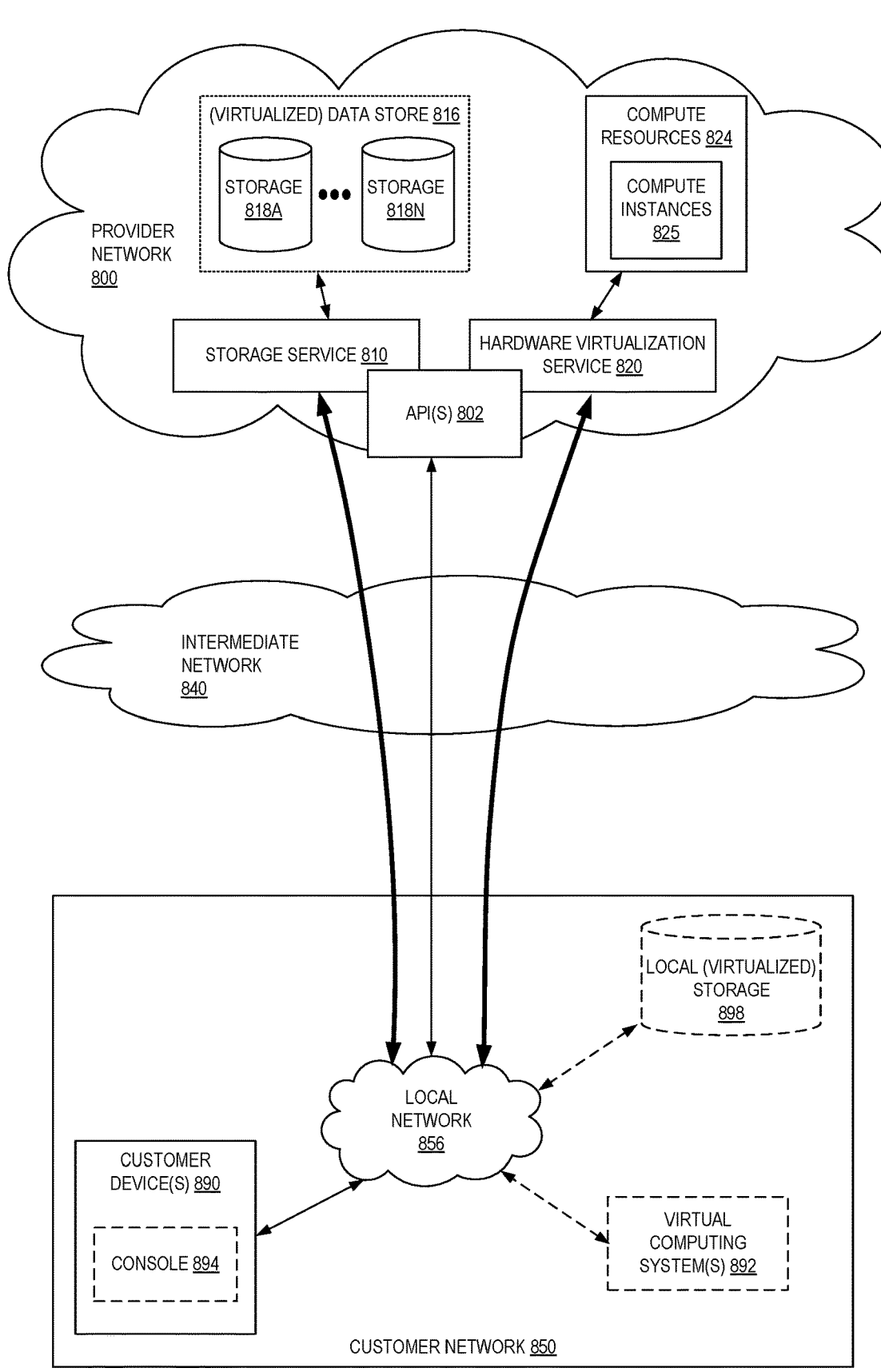
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s)

802 to request allocation of one or more resource instances within the virtual network or within another virtual network.

Figure 9:
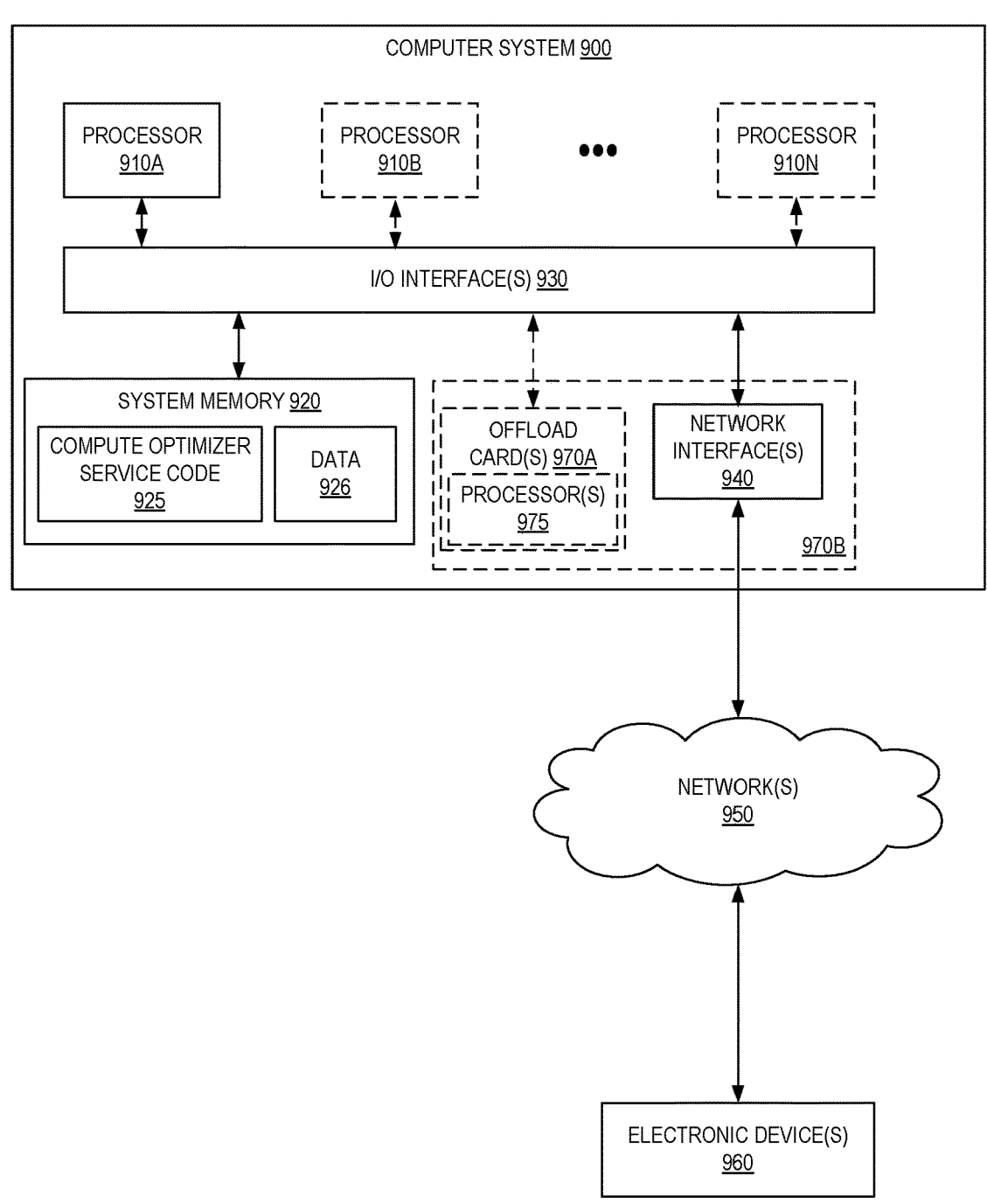
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as compute optimizer service code 925 (e.g., executable to implement, in whole or in part, the compute optimizer service 108) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and cannot coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
    receiving, by a compute optimizer service of a cloud provider network, a request to obtain optimization recommendations related to one or more workloads deployed by a user to the cloud provider network, wherein the one or more workloads execute using computing resources provided by the cloud provider network;

obtaining, by the compute optimizer service, time series data reflecting performance metrics of a workload of the one or more workloads over time, the time series data including multiple different dimensions of performance metrics data;

utilizing a multi-level classification process to generate a probability value indicative of whether the workload is network-intensive, comprising:

executing multiple feature extraction processes to yield a plurality of sets of features based on the time series data, wherein at least one set of features is generated based on applying multiple different convolutional kernels to the time series data;

providing the sets of features to an ensemble of heterogeneous classifiers that were independently trained using different feature extraction processes to obtain a plurality of preliminary result values, wherein each preliminary result value indicates a first probability that the workload is a network-intensive workload;

providing the plurality of preliminary result values to a meta-classifier configured to combine the preliminary result values to obtain a final result value, wherein the final result value comprises a second probability that the workload is a network-intensive workload based on the plurality of preliminary result values;

determining, based on the second probability exceeding a threshold, that the workload is a network-intensive workload;

generating, based on the second probability, a recommendation to optimize at least one computing resource used to execute the workload, the recommendation including a recommendation to use a different type of virtual machine instance for the workload; and causing display of the recommendation.

2. The computer-implemented method of claim 1, wherein the time series data includes data points reflecting, over a period of time for the workload, at least two of: central processing unit (CPU) utilization, inbound network throughput, outbound network throughput, inbound network traffic size, outbound network traffic size, inbound network packet count, network latency, packet loss, or outbound network packet count.

3. The computer-implemented method of claim 1, wherein the applying of multiple different convolutional kernels to the time series data comprises configuring each convolutional kernel with a set of parameters, wherein the parameters are either randomly generated from fixed distributions or selected from a predefined set of values, and wherein one or more features are generated from the output of each convolutional kernel.

4. The computer-implemented method of claim 3, wherein the one or more features generated from the output of each convolutional kernel comprise at least one of: a maximum value of the output, a proportion of positive values in the output, or a statistical or positional characteristic derived from the output of the convolutional kernel.

5. A computer-implemented method comprising:

obtaining, by one or more computing devices, time series data corresponding to performance metrics of a workload deployed by a user to a cloud provider network, wherein the workload executes using at least one virtual machine (VM) instance provided by the cloud provider network;

generating a plurality of sets of features based on the time series data, wherein at least one set of features is generated based on applying multiple different convolutional kernels to the time series data;

providing the plurality of sets of features based on the time series data to an ensemble of heterogeneous classifiers that were independently trained using different feature extraction processes to obtain a plurality of preliminary result values, wherein each preliminary result value indicates a first probability that the workload is a network-intensive workload;

providing the plurality of preliminary result values to a meta-classifier configured to combine the preliminary result values to obtain a final result value, wherein the final result value indicates a second probability that the workload is a network-intensive workload based on the plurality of preliminary result values;

determining, based on the second probability, that the workload is a network-intensive workload;

identifying, based on the determination that the workload is a network-intensive workload, a different type of VM instance that is more suitable for the workload; and causing display of a user interface providing a recommendation identifying the different type of VM instance.

6. The computer-implemented method of claim 5, wherein the time series data includes data points reflecting, over a period of time for the workload, at least two of: central processing unit (CPU) utilization, inbound network throughput, outbound network throughput, inbound network traffic size, outbound network traffic size, inbound network packet count, network latency, packet loss, or outbound network packet count.

7. The computer-implemented method of claim 5, wherein the recommendation comprises a a recommendation to migrate the workload from the VM instance to the different type of VM instance, wherein the different type of VM instance is a network-optimized VM instance type.

8. The computer-implemented method of claim 5, wherein the workload is one of a plurality of workloads deployed by the user to the cloud provider network, and wherein the method further comprises:

determining whether each workload of the plurality of workloads is a network-intensive workload; and causing display of an indication of workloads from the plurality of workloads identified as being network-intensive workloads.

9. The computer-implemented method of claim 5, wherein the meta-classifier is a k-nearest neighbor (KNN) classifier, a random forest classifier, or a decision tree classifier.

10. The computer-implemented method of claim 5, wherein the ensemble of classifiers includes at least two different classifiers from: a random forest classifier, a naive Bayes classifier, a ridge classifier, a decision tree classifier, a logistic regression-based classifier, a neural network classifier, a k-nearest neighbor (KNN) classifier, or a Diverse Representation Canonical Interval Forest Classifier (DrCIF).

11. The computer-implemented method of claim 5, wherein the time series data is collected by a monitoring service of the cloud provider network, wherein the monitoring service collects the time series data by monitoring execution of the workload over time.

12. The computer-implemented method of claim 5, wherein the ensemble of classifiers is trained based on one or more training sets reflecting performance metrics of example network-intensive workloads, wherein the example network-intensive workloads include at least one of: a load balancer, or a web server.

13. The computer-implemented method of claim 5, further comprising:

receiving an input requesting to implement the recommendation;

launching a new virtual machine instance of the different type; and migrating the workload to the new virtual machine instance.

14. The computer-implemented method of claim 5, wherein the applying of multiple different convolutional kernels to the time series data comprises configuring each convolutional kernel with a set of parameters, wherein the parameters are either randomly generated from fixed distributions or selected from a predefined set of values, and wherein one or more features are generated from the output of each convolutional kernel.

15. The computer-implemented method of claim 14, wherein the one or more features generated from the output of each convolutional kernel comprise at least one of: a maximum value of the output, a proportion of positive values in the output, or a statistical or positional characteristic derived from the output of the convolutional kernel.

16. A system comprising:

a first one or more electronic devices to implement a compute optimizer service in a multi-tenant provider network, wherein the compute optimizer service includes instructions that upon execution cause the compute optimizer service to:

obtain, from a monitoring service of the multi-tenant provider network, time series data corresponding to performance metrics of a workload deployed by a user to a cloud provider network, wherein the workload executes using at least one virtual machine (VM) instance provided by the cloud provider network, generate a plurality of sets of features based on the time series data, wherein at least one set of features is generated based on applying multiple different convolutional kernels to the time series data;

provide the plurality of sets of features based on the time series data to an ensemble of heterogeneous classifiers trained using different feature extraction processes to obtain a plurality of preliminary result values, wherein each preliminary result value indicates a first probability that the workload is a network-intensive workload, provide the plurality of preliminary result values to a meta-classifier configured to combine the preliminary result values to obtain a final result value, wherein the final result value indicates a second probability that the workload is a network-intensive workload based on the plurality of preliminary result values, determine, based on the second probability, that the workload is a network-intensive workload, identify, based on the determination that the workload is a network-intensive workload, a different type of VM instance that is more suitable for the workload, and cause display of a user interface providing a recommendation identifying the different type of VM instance; and a second one or more electronic devices to implement the monitoring service in the multi-tenant provider network, wherein the monitoring service includes instructions that upon execution cause the monitoring service to:

monitor execution of the workload, and collect the time series data corresponding to performance metrics of the workload.

17. The system of claim 16, wherein the time series data includes data points reflecting, over a period of time for the workload, at least two of: central processing unit (CPU) utilization, inbound network throughput, outbound network throughput, inbound network traffic size, outbound network traffic size, inbound network packet count, network latency, packet loss, or outbound network packet count.

18. The system of claim 16, wherein the recommendation comprises a recommendation to migrate the workload from the VM instance to the different type of VM instance, wherein the different type of VM instance is a network-optimized VM instance type.

19. The system of claim 16, wherein the workload is one of a plurality of workloads deployed by the user to the cloud provider network, and wherein the compute optimizer service further includes instructions that upon execution cause the compute optimizer service to:

determine whether each workload of the plurality of workloads is a network-intensive workload; and cause display of an indication of workloads from the plurality of workloads identified as being network-intensive workloads.

20. The system of claim 16, wherein the compute optimizer service, as part of the generation of the plurality of sets of features, is to apply multiple different convolutional kernels to the time series data, wherein each convolutional kernel is configured with a set of parameters, the parameters being either randomly generated from fixed distributions or selected from a predefined set of values, and wherein one or more features are generated from the output of each convolutional kernel.

* * * * *